United States Patent [19]

Takahashi

[11] Patent Number: 5,745,707
[45] Date of Patent: Apr. 28, 1998

[54] BUS CONTROL DEVICE FOR COMPUTER SYSTEM HAVING COMPUTER AND DMA DEVICE

[75] Inventor: Akira Takahashi, Niigata, Japan

[73] Assignee: NEC Corporation, Tokyo, Japan

[21] Appl. No.: 504,957

[22] Filed: Jul. 20, 1995

[30] Foreign Application Priority Data

Jul. 20, 1994 [JP] Japan .................................. 6-168236

[51] Int. Cl.$^6$ ................................................ G06F 13/00
[52] U.S. Cl. .................... 395/290; 364/240; 364/240.5; 364/242.31; 364/242.92; 364/DIG. 1
[58] Field of Search ........................... 395/290, 309, 395/470, 473, 427, 500

[56] References Cited

U.S. PATENT DOCUMENTS 5,289,584  2/1994  Thome et al. ........................ 395/325
5,293,603  3/1994  MacWilliams et al. .............. 395/425
5,448,558  9/1995  Gildea et al. ........................... 370/60
5,519,839  5/1996  Culley et al. ......................... 395/310

*Primary Examiner*—Kevin J. Teska
*Assistant Examiner*—Ayni Mohamed
*Attorney, Agent, or Firm*—Foley & Lardner

[57] ABSTRACT

In a bus control device for DMA processing/external master transfer which is carried out by a personal computer having a write back cache, a route having a high-speed buffer inserted between a data bus for peripherals and a host data bus is separately provided, data which are written back (copied) into a main memory through a write-back operation which is required when a cache memory is dirty-hit at a read-access time of a DMA device into a cache area of the main memory are also supplied to and stored in the high-speed buffer as well as the main memory, and the high-speed buffer is allowed to perform a data access with the DMA device or an external bus master. Therefore, the DMA device/external bus master are separated from the host data bus.

4 Claims, 3 Drawing Sheets

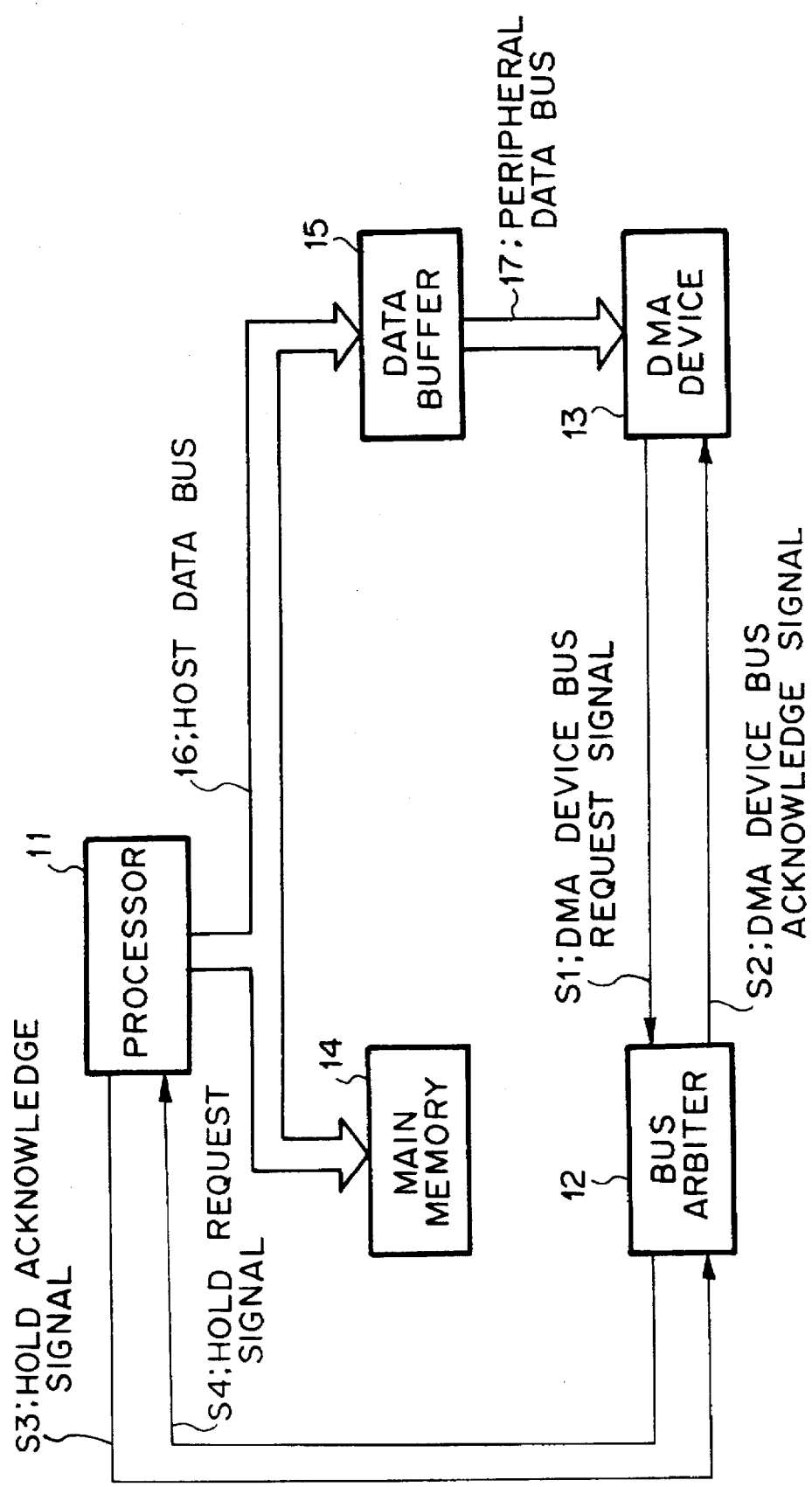

BUS CONTROL DEVICE FOR COMPUTER SYSTEM HAVING COMPUTER AND DMA DEVICE

BACKGROUND OF THE INVENTION

1. Field of the Invention

The present invention relates to a bus control device for use in a personal computer including a write back cache. Here, the term "write back cache" is defined as follows. When a CPU, a cache memory and a main memory are connected in series to one another through a bus, there occurs a case where data of the cache memory and data of the main memory are different from each other during an access operation of the CPU although the same address is allocated to these data because the newest data are stored in the cache memory whereas the newest data are not necessarily stored in the main memory. As described above, the newest data are stored in the cache memory, and thus if a demand for DMA transfer is made, it is necessary to copy the data of the cache memory into the main memory and then perform the DMA transfer from the main memory to an external (DMA) memory such as a floppy disc or the like. The data copy in this case is called as "write back", and the cache memory which performs this action is called as "write back cache".

2. Description of Related Art

FIG. 3 is a block diagram showing a bus arbitration system which is carried out by a conventional personal computer.

In this system, various devices such as a processor 11, a DMA (Direct Memory Access) device 13, etc. use a bus (in this case, the processor 11 and the DMA device 13 use the host data bus 16), and thus any one of the devices is successively selected to be dominantly connected to the bus. Now, it is assumed that the DMA device 13 demands to use the bus in the system shown in FIG. 3. In this case, the DMA device 13 asserts a DMA device request signal S1 to a bus arbiter 12. When the bus arbiter 12 recognizes that the DMA bus request signal S1 is asserted, it asserts a hold request signal S4 to the processor 11 to request release of a host data bus 16. If the processor 11 itself is using the host data bus 16, the processor 11 asserts a hold acknowledge signal S3 to the bus arbiter 12 to release the host data bus 16 and a peripheral data bus 17 immediately after it finishes up its processing. If the host data bus 16 is in a hold state, the processor 11 immediately asserts the hold acknowledge signal S3 to the bus arbiter 12.

When the bus arbiter 12 recognizes that the hold acknowledge signal S3 from the processor 11 is active, it asserts a DMA device bus acknowledge signal S2 to the DMA device 13. At this time, the DMA device 13 is allowed to use the bus (host data bus 16 and the peripheral data bus 17), so that it is allowed to perform data access with the main memory 14 through the host data bus 16, a data buffer 15 and the peripheral data bus 17. When the DMA device 13 finishes its processing, it negates the DMA device bus request signal S1, and in response to this negation, the bus arbiter 12 negates the hold request signal S4. With this operation, the processor 11 closes the host data bus 16 and the peripheral data bus 17, and waits for a next instruction or carries out processing which has not yet been finished.

As described above, in the conventional bus arbitration system for a personal computer, the DMA device 13 and the processor 11 perform their processing time-divisionally. In this system, however, the processor 11 must be kept in a hold state during a period for which the DMA device occupies the host data bus 16 because the host data bus 16 is exclusively used for the DMA device, and thus the high-speed processing performance of the processor is obstructed by the DMA device 13 such as a floppy disc, a hard disc or the like which has a low-speed data-transfer capability. This problem becomes greater as the difference in data-transfer capability between the processor and the DMA device increases.

SUMMARY OF THE INVENTION

An object of the present invention is to provide a bus control device in which the processing capability of a processor can be maintained without obstruction due to the processing time of a DMA device in a bus arbitration system in a personal computer.

Another object of the present invention is to provide a bus control device in which both the processor and the DMA device can individually perform respective processing with the respective maximum performance in their shortest processing period in accordance with the respective processing capability.

In order to accomplish the above objects, a bus control device for DMA processing/external master transfer which is carried out by a personal computer having a write-back cache, is characterized in that a route having a high-speed buffer inserted between a data bus for peripherals and a host data bus is separately provided, and that data which are written back into main memory through a write-back operation which is required when a cache memory is dirty-hit at a read-access time of a DMA device into a cache area of the main memory are also supplied to and stored in the high-speed buffer as well as the main memory, and the high-speed buffer is allowed to perform a data access with the DMA device or an external bus master, whereby the DMA device/external bus master are separated from the host data bus.

In the bus control device, the high-speed buffer may be achieved by FIFO.

BRIEF DESCRIPTION OF THE DRAWINGS

FIG. 3 is a block diagram of a conventional bus control device.

DETAILED DESCRIPTION OF THE PREFERRED EMBODIMENT

A preferred embodiment according to the present invention will be described hereunder with reference to the accompanying drawings.

Figure 1:
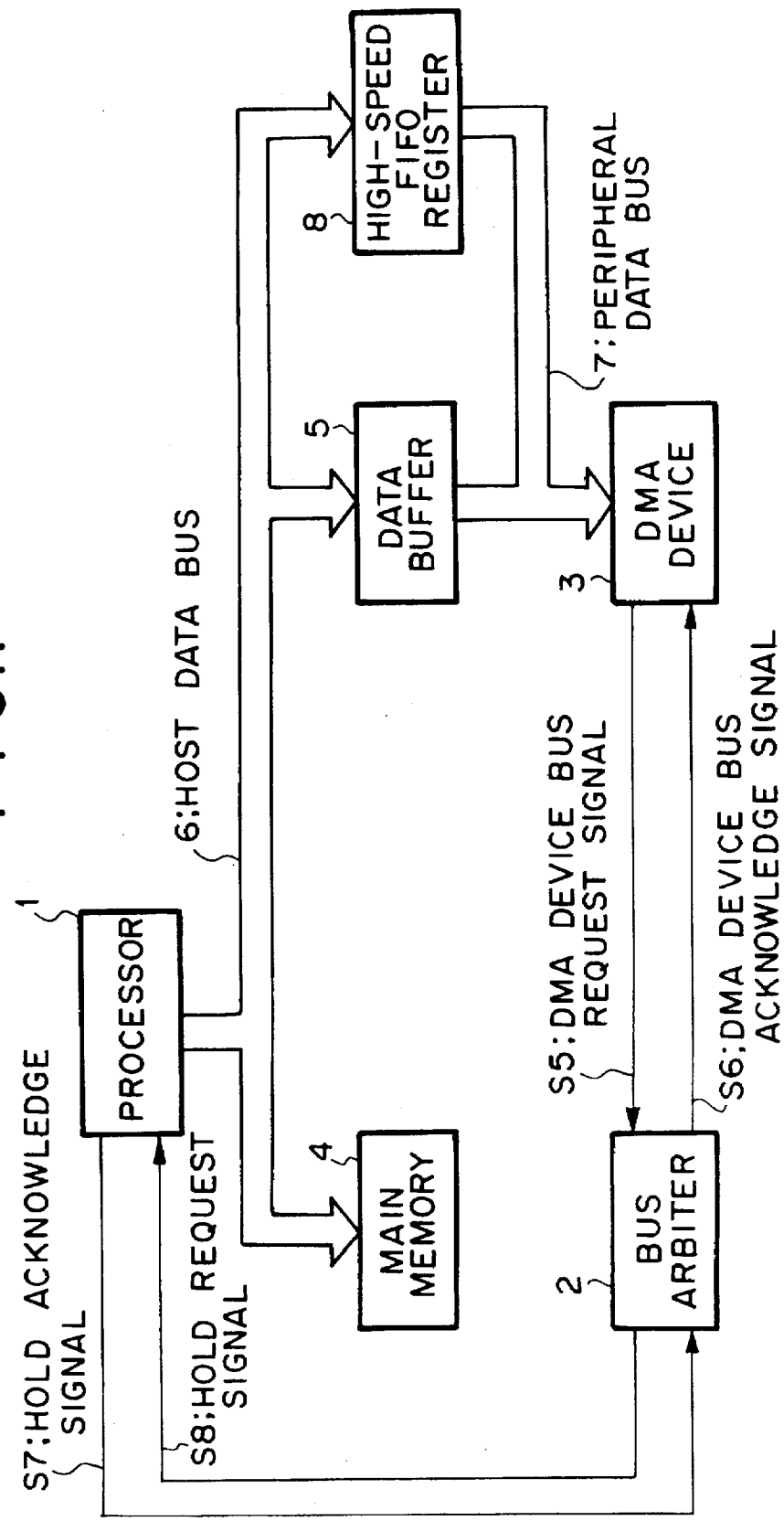
FIG. 1 is a block diagram of an embodiment of a bus control device for use in a personal computer of the present invention.

FIG. 1 is a block diagram showing an embodiment of a high-speed bus transfer system in a write back cache system which comprises a processor 1, a bus arbiter 2, a DMA device 3, a main memory 4, a data buffer 5, a host data bus 6, a data bus 7 for peripherals (hereinafter referred to as peripheral data bus"), and a high-speed FIFO register 8.

The processor 1 contains a write-back type of cache memory therein. When a dirty-hit occurs in the cache memory of the processor 1 as a result of a snooping operation at a read time of the cached area of the main memory 4 by the DMA device 3, the processor 1 schedules a write-back operation on the main memory 4. Here, the term "dirty-hit" is defined as follows. It is assumed that the same data were previously stored with the same address in both the main memory and the cache memory, but the data in the cache memory is afterwards updated with new data which is stored at the same address in the cache memory. This data-renewed state of the cache memory is called a "dirty hit". In this state, when the DMA transfer of the newest data is requested between the main memory 4 and the DMA device 3, the processor 1 first copies the newest data into the main memory 4 (this operation is called as "write back"), and then starts the DMA transfer between the main memory 4 and the DMA device 3.

In this embodiment, the data to be written back are supplied to and stored in not only the main memory 4, but also the high-speed FIFO register 8 which is provided between the DMA device 3 and the host data bus 6. Accordingly, the data which are required by the DMA device 3 are stored in the high-speed FIFO register 8 after the write-back operation. Therefore, the DMA device 3 is not required to hold (be connected to) the host data bus 6 and then access the main memory 4, and it is merely required only to access the high-speed FIFO register 8 for the DMA transfer.

Accordingly, the DMA device 3 and the host data bus 6 can be separated from each other while the DMA device 3 carries out data access with the high-speed FIFO register 8, so that the processor 1 can perform its processing with no interruption even when the DMA transfer is requested from the DMA device (i.e., during a period when the DMA device 3 occupies the host data bus 6 to perform its processing in the prior art). Furthermore, when a snooping operation occurs at a write-access time and a read-access time of the DMA device 3 to the main memory 4, the DMA transfer processing is carried out with the conventional route containing the data buffer 5 and without the route containing the high-speed FIFO register 8 as described above.

The high-speed FIFO register 8 has a function of temporarily storing or outputting write-back data which are supplied from the processor 1. From this viewpoint, any device having a different control method from the high-speed FIFO register may be substituted for the high-speed FIFO register insofar as the device has the above function.

Figure 2:
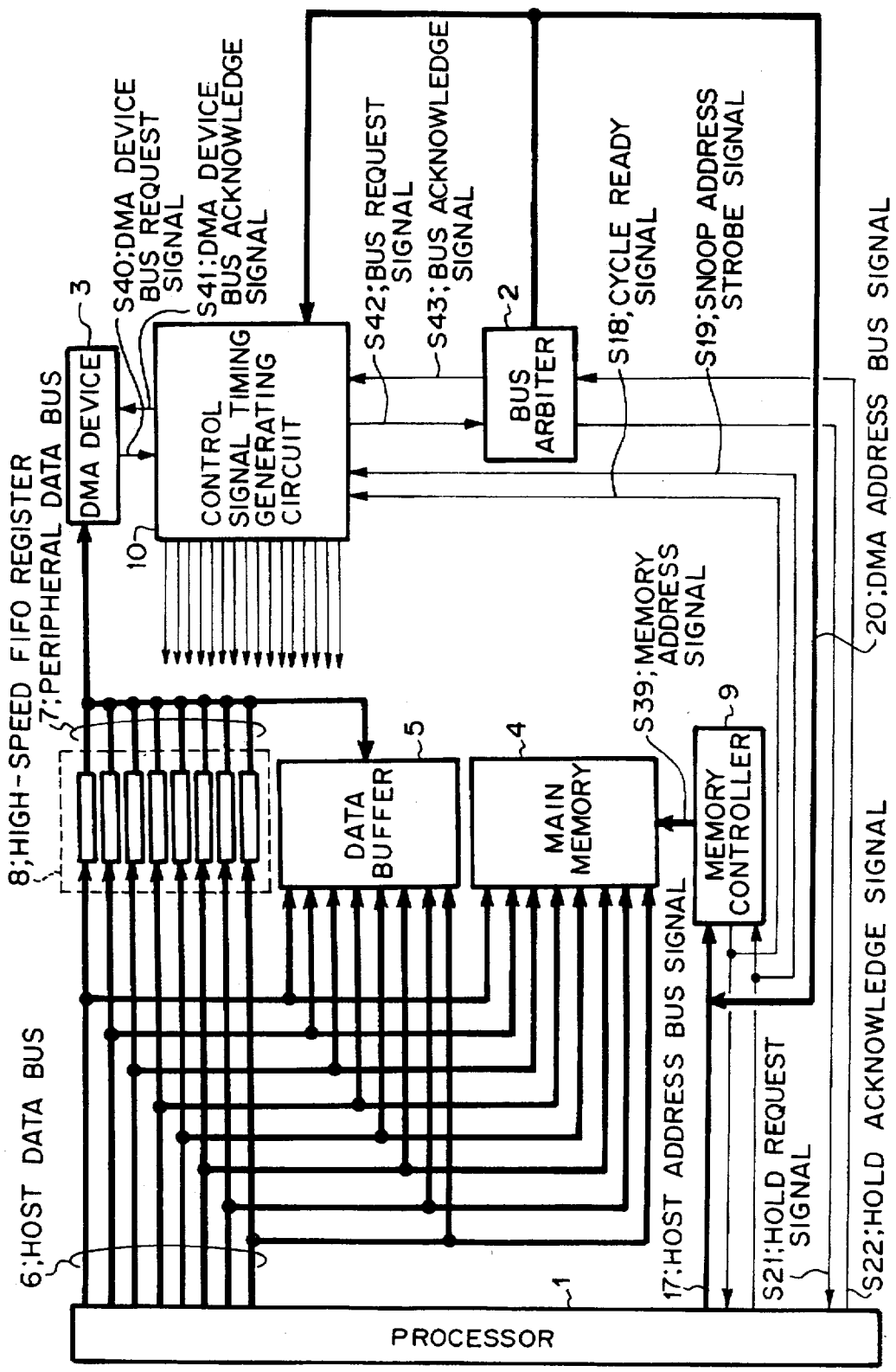
FIG. 2 is a circuit diagram showing the bus control device of the embodiment of the present invention.

FIG. 2 is a detailed circuit diagram of the embodiment of FIG. 1. In FIG. 2, a memory controller 9 and a control signal timing generating circuit 10 are added.

The data bus width of the processor 1 is set to 64 bits. The host data bus 6 is sectioned into eight segments each of which comprises 8 bits, and the high-speed FIFO register 8 comprises eight FIFOs. The write-back data are supplied not only to the main memory 4, but also to the eight FIFOs through the eight-sectioned host data bus 6 at a write-back cycle.

Assuming that the data amount which is written back into the main memory 4 through one write-back operation is four times as long as the data bus width (8 bits) of the processor 1, data of 32 bytes are written back into the main memory 4.

The depth of each of the FIFOs constituting the high-speed FIFO register group 8 is set to 4, and the high-speed FIFO register group 8 is controlled for every byte with a data load signal on FIFO basis which is output from the control signal timing generating circuit 10. The write-back data which are loaded into the high-speed FIFO register 8 to be output to the peripheral data bus 7 in controlled for every byte with a data OE signal on FIFO basis which are output from the control timing generating circuit 10. As described above, the reason why the FIFO is controlled on byte basis is to meet a case where the bus control device is connected to the DMA device 3 such as a floppy disc device or the like which performs a data delivery with the peripheral data bus 7 on byte basis.

Next, an operation of the system in which the DMA device 3 performs the data access on byte basis will be described hereunder.

First, a DMA device bus request signal S40 is asserted from the DMA device 3 to the control signal timing generating circuit 10. In response to this signal, the control signal timing generating circuit 10 asserts a bus request signal S42 to the bus arbiter (DMA controller) 2. Subsequently, the bus arbiter 2 asserts a hold request signal S21 to the processor 1, and the processor 1 asserts a hold acknowledge signal S22 to the bus arbiter 2 at a suitable timing.

In response to the hold acknowledge signal S22, the bus arbiter 2 asserts a bus acknowledge signal S43 to the control signal timing generating circuit 10, and the control signal timing generating circuit 10 asserts a DMA device bus acknowledge signal S41 to the DMA device 3.

The DMA address bus signal S20 is supplied from the bus arbiter 2 onto a host address bus signal S17 and is also supplied to the control signal timing generating circuit 10. In the case of the DMA read-access to the main memory 4, the DMA address bus signal S20 is snooped, i.e. monitored, by the processor 1. It is assumed that as a result of the snoop operation, a dirty-hit occurs in the cache memory of the processor 1 and the write-back cycle is scheduled.

A cycle start timing signal indicating the write-back cycle at which the processor 1 is started is supplied to a memory controller 9 and the control signal timing generating circuit 10 with a snoop address strobe signal S19, and the control signal timing generating circuit 10 controls take-in timing for the write-back data with a cycle ready signal S18 from the main controller 9. The DMA device 3 is not allowed to perform data access to the high-speed FIFO register 8 unless the write-back cycle is finished. That is, the DMA device 3 is allowed to access to the high-speed FIFO register 8 only when the write-back cycle is finished. At the same time, the control signal timing generating circuit 10 negates the bus request signal S42, and in response to this negation, the bus arbiter 2 negates the hold request signal S21 to the processor 1.

By temporarily separating the DMA device 3 from the peripheral data bus 7 as described above, the bus is allowed to be accessed by another device which demands to use the bus, so that the processing can be apparently multiplexed. Furthermore, when the snoop is mis-hit at the write-access time of the DMA device 3 to the main memory 4, at the read-access time of the DMA device 3 to a non-cache area or at the read-access time of the DMA device 3 to the main memory 4, the data transfer is performed along a normal route via the data buffer 5 without passing through the high-speed FIFO register 8.

When the DMA device 3 is a floppy disc device, the floppy disc device performs data delivery through a byte access, and it needs a time of about 1 µs for one data transfer operation. At this time, in the case where the high-speed FIFO register 8 has a maximum data storage capacity of 32 bytes (equal to the data amount which can be written back by one write-back operation), if a dirty-hit occurs at the head address of a first line of the cache memory at the time when data is read out from the main memory 4 by the floppy disc device corresponding to the DMA device 3, the write-back is carried out and thus the high-speed FIFO register 8 is filled. In this case, the floppy disc device performs subsequent data access on only the high-speed FIFO register 8, and it is kept separate from the host data bus 6. Accordingly, the host data bus 6 is released from the floppy disc device and supplied to the processor for a longer time by about 32 μs as compared with the conventional system. Assuming the average throughput of the processor 1 to be equal to 400 MB/S, the processor 1 can transfer data of 12.8 KB for 32 μS, and the data transfer efficiency of the bus can be improved.

The present invention is not limited to the above embodiment, and various modifications may be made without departing from the subject matter of the present invention. For example, in place of the high-speed FIFO register 8, a high-speed static RAM may be provided.

According to the present invention, the host data bus can be rapidly supplied to the CPU when the write-back operation is carried out, so that the high-speed processing capability of the processor can be suppressed from being deteriorated.

What is claimed is:

1. A bus control system for DMA processing/external master transfer in a personal computer having a write-back cache, comprising:

a processor for controlling said bus control system said processor containing a cache memory therein for a write-back cache system;

a main memory connected to said processor for storing read and write data of said processor, a data buffer for serving as a buffer for data from said processor;

a high-speed buffer for performing a high-speed write-in and read-out operation for data from said processor;

a DMA device that is a data delivery target of said processor, for directly performing data transfer with an external device;

a host data bus connecting said processor, said high-speed buffer, said main memory and said data buffer;

a peripheral data bus connecting said high-speed buffer, said data buffer and said DMA device; and a bus arbiter for arbitrating use of said data bus between said processor and said DMA device, wherein, at a read-access time of said DMA device to said cache memory, data written back through a write-back operation are supplied to and stored in both of said main memory and said high-speed buffer, said arbiter allowing said DMA device to perform data access to said high-speed buffer by means of said peripheral bus upon completion of said write-back operation, and a control signal timing generating circuit for transmitting a bus request signal to said bus arbiter in response to a DMA device bus request signal from said DMA device, said bus arbiter instructing said processor to separate said host data bus and said peripheral data bus from each other upon receipt of said bus request signal from said control signal timing generating circuit.

2. The bus control system as claimed in claim 1, wherein after the separation of said host data bus and said peripheral data bus from each other is instructed, said DMA device requests said high-speed buffer to perform data transfer through said peripheral data bus.

3. The bus control system as claimed in claim 1, wherein when said DMA device write-accesses said cache memory or read-accesses said main memory, the data transfer is performed through said data buffer if a snoop is mis-hit.

4. The bus control system as claimed in claim 1, wherein said high-speed buffer comprises a FIFO or a high-speed static RAM.

* * * * *